United States Patent
Muttik et al.

(10) Patent No.: US 7,243,373 B2
(45) Date of Patent: *Jul. 10, 2007

(54) ON-ACCESS MALWARE SCANNING (75) Inventors: Igor Muttik, Berkhamsted (GB); Francois Paget, Saint Gratien (FR); Marius Hendrik Maria Van Oers, Kerkdriel (NL)

(73) Assignee: McAfee, Inc., Santa Clara, CA (US)

( * ) Notice: Subject to any disclaimer, the term of this patent is extended or adjusted under 35 U.S.C. 154(b) by 1120 days.

This patent is subject to a terminal disclaimer.

(21) Appl. No.: 09/911,765

(22) Filed: Jul. 25, 2001

(65) Prior Publication Data

US 2003/0023864 A1    Jan. 30, 2003

(51) Int. Cl.
G06F 11/00 (2006.01)
G08B 23/00 (2006.01)
H04L 9/32 (2006.01)

(52) U.S. Cl. .................................. 726/24; 713/188
(58) Field of Classification Search .............. None
See application file for complete search history.

(56) References Cited

U.S. PATENT DOCUMENTS

| | | | |
|---|---|---|---|
| 6,393,568 B1 * | 5/2002 | Ranger et al. .............. 713/188 |
| 6,748,534 B1 * | 6/2004 | Gryaznov et al. .......... 713/188 |
| 6,851,058 B1 * | 2/2005 | Gartside ...................... 726/24 |
| 7,043,758 B2 | 5/2006 | Grupe .......................... 726/24 |
| 2002/0194487 A1 * | 12/2002 | Grupe ........................ 713/200 |

* cited by examiner

*Primary Examiner*—Gilberto Barrón, Jr.
*Assistant Examiner*—Kristin D. Sandoval
(74) *Attorney, Agent, or Firm*—Zilka-Kotab, PC; Christopher J. Hamaty (57) ABSTRACT

An on-access malware scanner (anti-virus, e-mail scanner) is provided which determines whether a scan to be performed has above a threshold level of complexity and if so divides the scan into a plurality of different tasks. These different tasks are then delegated to further computers (50, 52, 54) in a distributed processing approach with the further computers then returning their task results to the coordinating computer for combination to form an overall scan result. Computer files containing embedded files may be divided into separate computer files that are scanned as separate tasks. Furthermore, an individual computer file may be scanned for different properties by different computers as separate tasks. The selection of which tasks to distribute to which further computers may be made in dependence upon the complexity of the task to be delegated, the communication channel bandwidth to that further computer and the processing resources available at that further computer.

16 Claims, 6 Drawing Sheets

ON-ACCESS MALWARE SCANNING

BACKGROUND OF THE INVENTION

1. Field of the Invention

This invention relates to the field of data processing systems. More particularly, this invention relates to on-access malware scanning, such as for example scanning for the presence of a computer virus within a computer file which it is desired to access at the time at which the access request to that file is made.

2. Description of the Prior Art

It is known to provide on-access malware scanners, such as those produced by Network Associates, Inc. A problem that arises with such scanners is that as the complexity of the files to be scanned increases then the time required for the scanning to complete becomes disadvantageously large. This is particularly important in relation to an on-access scanner as the scanning must complete before the user is granted access to the file concerned and accordingly excessive delays are highly visible to a user and in the case of devices, such as PDAs, with low computing power.

SUMMARY OF THE INVENTION

Viewed from one aspect the present invention provides a computer program product for controlling a computer, said computer program product comprising:

(i) scan request receiving logic operable to receive a request to perform an on-access malware scan upon a computer file to which access is to be made;

(ii) scan dividing logic operable to divide said on-access malware scan into a plurality of tasks;

(iii) task issuing logic operable to issue said plurality of tasks to be performed by a plurality of different computers; and (iv) result collating logic operable to collate a plurality of task results corresponding to said plurality of tasks and received from said plurality of different computers to form a scan result corresponding to said on-access malware scan.

Whilst it might normally be considered that the real-time nature of an on-access scan would preclude the possibility of adopting a distributed processing approach to the scan, the amount of processing required by a scan has increased to such a level and the communication links now have sufficient bandwidth that a distributed approach to an on-access scan is surprisingly advantageous. Furthermore, malware scanning is surprisingly well suited to distributed processing since it is highly computationally intensive relative to the amount of data that needs to be transferred between the different distributed computers. The invention also recognises that an on-access malware scan of a computer file can be broken down into a number of independent tasks that may be delegated to different computers.

The on-access malware scan could be divided into tasks in a number of different ways. One preferred division technique is to divide the computer file into a plurality of component computer files, such as embedded computer files (e.g. OLE2 computer files and ZIP Files). Another preferred division technique is to divide the on-access malware scan into a plurality of on-access malware scans for identifying different properties of the computer file, such as separate scans to identify non-polymorphic computer viruses, polymorphic computer viruses and heuristic properties of the computer file indicative of it containing a computer virus.

The present technique is particularly well suited to identifying computer viruses, Trojan computer programs, worm computer programs, banned computer programs and e-mails containing banned content, such as banned words, images etc.

It may well be that when an on-access malware scan has been divided into different tasks, some of those tasks may themselves be of a nature that they require a disadvantageously long time to complete and accordingly preferred embodiments of the invention provide for the further division of a task into sub-tasks. This further division may be repeated in a nested fashion as required.

The issuing of different tasks to different computers is advantageously performed in dependence upon one or more of a measure of available processing resources at the different computers, a measure of communication channel bandwidth to the different computers, and a measure of the complexity of the tasks to be issued. Accordingly, for example, a highly computationally intensive task requiring relatively little transfer of data could be issued to a different computer connected by a relatively low bandwidth connection but having a high level of processing resources available to conduct that task whereas a more computationally straightforward task requiring a large amount of data to be transferred could be sent to a computer having a high bandwidth connection but relatively few processing resources available. Thus, the tasks may be matched to the different computers to which they are issued.

It will be appreciated that the time taken to set up and perform the distributed approach to scanning may not be justified in all cases and accordingly preferred embodiments do not divide an on-access malware scan if it is detected as having a complexity below a predetermined threshold level.

The complexity of an on-access malware scan can be at least estimated in dependence upon the file type, whether the computer file contains any embedded computer files, the level of nesting of any embedded computer files or if an initial attempt to scan the computer file has taken longer than a predetermined time.

If any of the tasks detects malware within the computer file, then the other tasks may be terminated as special handling of that computer file will normally be required.

As well as providing a computer program product for controlling a distributed processing approach to on-access malware scanning, a complementary aspect of the invention also provides the computer program that serves to receive the divided tasks. It will be appreciated that an individual computer may act as either or both of the divider and coordinator of a distributed processing attempt as well as an agent for receiving tasks from other computers.

Further aspects of the present invention provide a method for performing an on-access malware scan in accordance with the above techniques and an apparatus for performing an on-access malware scan in accordance with the above techniques.

The above, and other objects, features and advantages of this invention will be apparent from the following detailed description of illustrative embodiments which is to be read in connection with the accompanying drawings.

DESCRIPTION OF THE PREFERRED EMBODIMENTS

Figure 1:
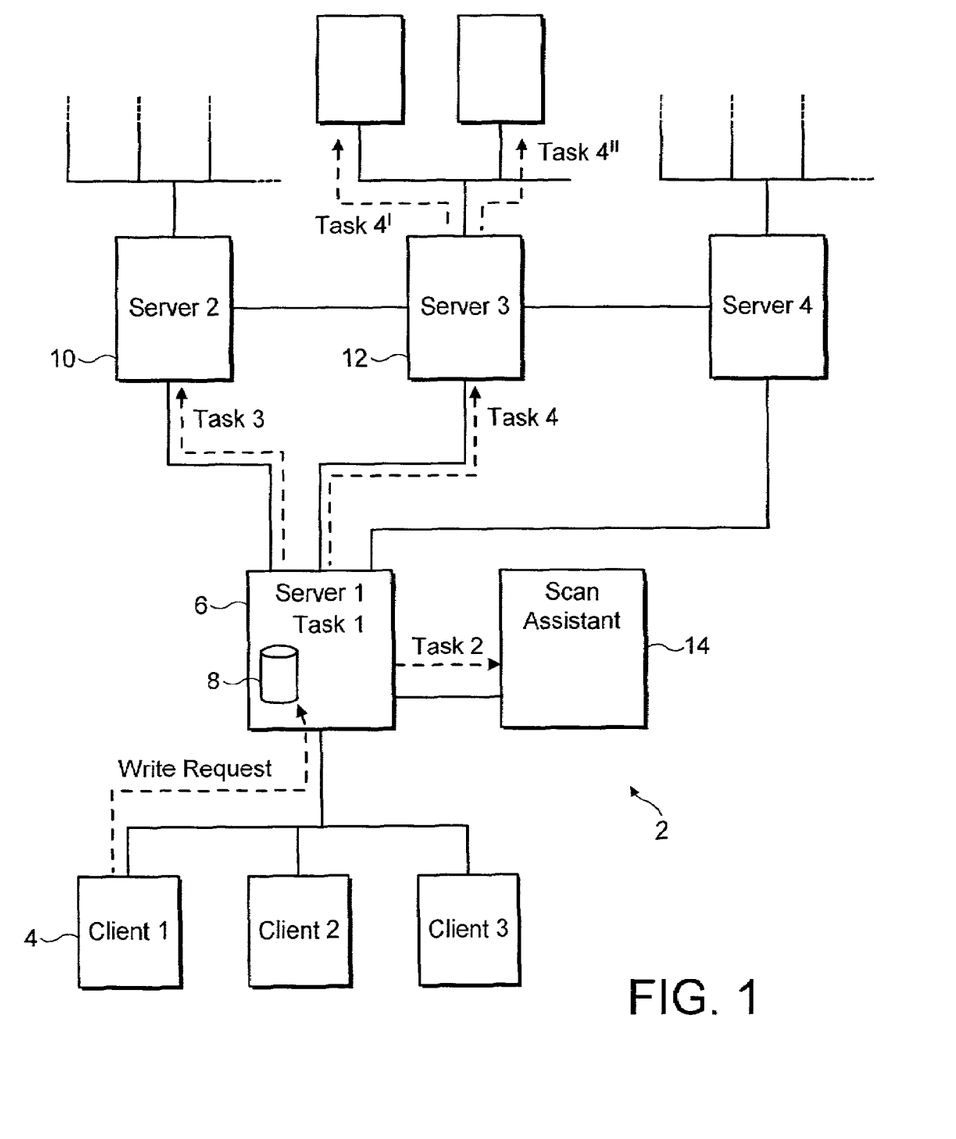
FIG. 1 schematically illustrates a plurality of network connected computers for performing a distributed on-access malware scan.

FIG. 1 illustrates a computer network 2 containing a plurality of network servers that are interconnected with one another and each have their own associated client computers. Some or all of the network links may be wireless links. In the example illustrated, the client computer 4 makes a file write access request to its server computer 6. (Another example of an on-access scan would be a user making a request to execute a locally stored file such that the file must be virus scanned before execution can safely be started) The server computer 6 is running network anti-virus software and accordingly should virus scan the computer file being written by the client computer 4 before it is stored upon the hard disk drive 8 of the server computer 6. The computer file being written may be sufficiently large and complex, such as a large Powerpoint Presentation file containing multi-nested levels of embedded further files, that the server computer 6 determines that the scanning time for this computer file will be above a threshold level. The server computer 6 accordingly divides the on-access scan down into a plurality of separate tasks, in this case four tasks. The server computer 6 monitors the resources available in a plurality of further computers 10, 12, 14 that are running agents for assisting in distributed scanning and issues the divided tasks between these further computers in accordance with their capabilities. One of the tasks is retained by the server computer 6.

In the example illustrated, a specific scanner assisting computer 14 is associated with the server computer 6 and connected via a high band width connection (such as sharing a common bus) to provide dedicated scanning assistance to the server computer 6. The further computers 10, 12 are other servers connected to the server computer 6 that at that time have processing resources available to assist in the scanning task and suitable high bandwidth connections to the server computer 6.

It will be appreciated that in the illustrated example the client computer 4 originated the write request, the scanning of this write request was the responsibility of the server computer 6 and the server computer 6 divided the scanning into separate tasks and delegated some of these to further computers. It is equally possible that the client computer 4 could have made a file access request local to itself and then itself acted to co-ordinate distribution of the scanning associated with that file access request to one or more further computers. In the example illustrated, the server computer 6 retains one of the tasks to be performed by itself, but in alternative embodiments it could delegate all of the tasks elsewhere and merely serve as the co-ordinator. All of these possibilities are encompassed within the present technique.

In the illustrated example, the task that is delegated to the server computer 12 turns out to be more computationally intensive than can be readily handled by the server computer 12 itself, e.g. multiple levels of ZIP files within ZIP files. Accordingly, the server computer 12 acts upon its own initiative to further sub-divide this task into sub-tasks that are delegated to further computers associated with the server computer 12. This sub division of tasks can be performed at multiple levels using the same principles as used for the initial division.

Figure 2:
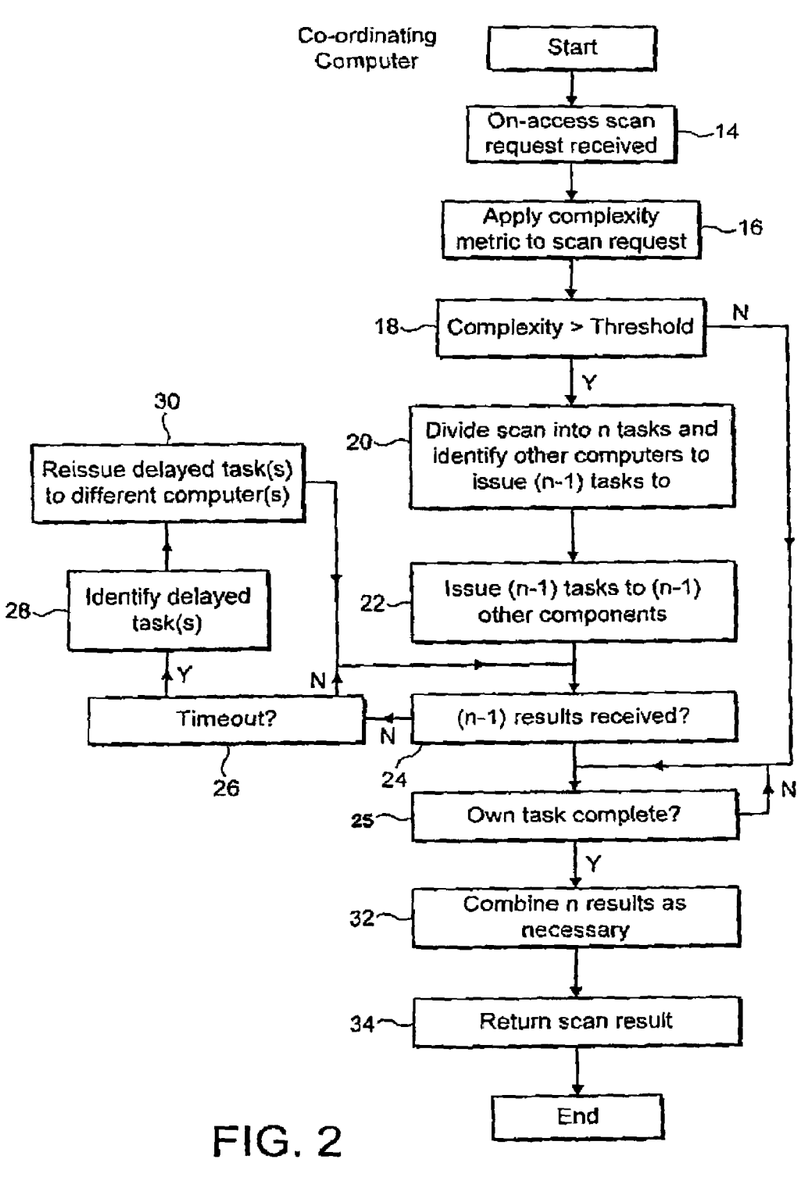
FIG. 2 is a flow diagram schematically illustrating the processing performed by a co-ordinating computer.

FIG. 2 is a flow diagram illustrating an example of the processing that may be performed by the server computer 6. At step 14 an on-access scan request is received. At step 16 a determination of the complexity of that received request is made by applying a complexity metric. The metric may be dependent upon a variety of parameters, including the computer file type, the presence of any embedded computer files, the level of nesting of any embedded computer files, an initial attempt to scan that computer file that took longer than a predetermined time or other factors. The level of utiliztion of the local processor may also be used in the determination of whether or not to split the scanning task.

At step 18 the complexity determined at step 16 is compared with a threshold level and if the complexity does not exceed this threshold level, then processing proceeds to step 25 at which the scanning task is maintained as a single entity and performed the server computer 6 itself.

If the test at step 18 indicated that the complexity exceeded the threshold level, then processing proceeds to step 20 at which the on-access scan is divided into n tasks and the computers to which those tasks are to be issued are identified. The selection of the computers to which the tasks are to be issued will be discussed further below. In this example one of the tasks is retained by the server computer 6 and accordingly n−1 require distribution. At step 22 the n−1 tasks are issued to the n−1 different computers that have been identified at step 20.

At step 24, the server computer 6 tests whether all of the n−1 task results have been received from the computers to which the tasks were delegated. If all the task results have not been received, then processing proceeds to step 26 at which a determination is made as to whether or not any of the tasks has exceeded a timeout period allowed for that task. If the timeout period has not been exceeded, then processing returns to step 24. If the timeout value has been exceeded, then processing proceeds to step 28 at which any excessively delayed tasks are identified and then these tasks are reissued to different computers at step 30 before returning processing to step 24. Computers which have excessively delayed returning their task results are removed from consideration to have further tasks delegated to them. Remote computers may also transmit their level of utilization to the co-ordinating computer and this may be used to allocate tasks initially or to decide to terminate a task.

Once all the delegated task results have been received at step 24, step 25 serves to identify whether the server computer 6 has itself completed its own task. When this task has been completed, processing proceeds to step 32 at which the plurality of task results are combined to produce an overall result. If the original scan request was in fact not divided, then the combination of step 32 would not be necessary. A combined result is then returned at step 34.

An additional refinement that may be made is that step 24 can continuously check whether any of the task results it has received indicate that malware has been detected. If any of the tasks does detect malware, then the pending further tasks may be terminated and an appropriate special handling process initiated for the computer file since repair, deletion, quarantining or other action will typically be required for the computer file in question and the processing delay associated with handling this in a non-distributed fashion will be insignificant as malware has in fact been detected.

Figure 3:
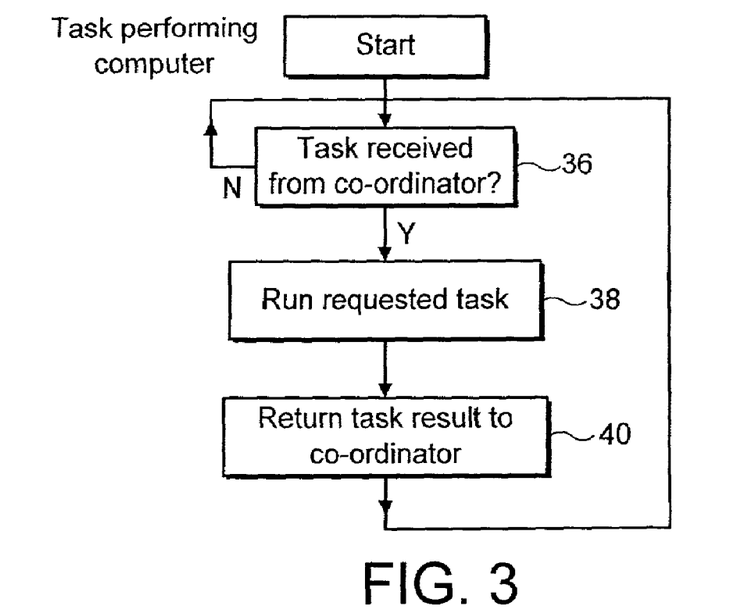
FIG. 3 is a flow diagram schematically illustrating the processing performed by a computer to which a divided task is delegated.

FIG. 3 is a flow diagram illustrating the processing that is performed at computer 2 which tasks are delegated. At step 36 the computer waits to receive a task from a coordinator. When a task is received, then this task is performed at step 38 and the result is returned to the co-ordinator at step 40 before processing returns to step 36.

It will be appreciated that an individual computer may run either or simultaneously both of the processes illustrated in FIGS. 2 and 3. A co-ordinating computer may continuously poll its associated computers to which it may delegate tasks to keep track of the processing resources currently available to perform scanning within those further computers. This can help the coordinating computer determine an appropriate way in which to delegate the tasks to different computers.

Figure 4:
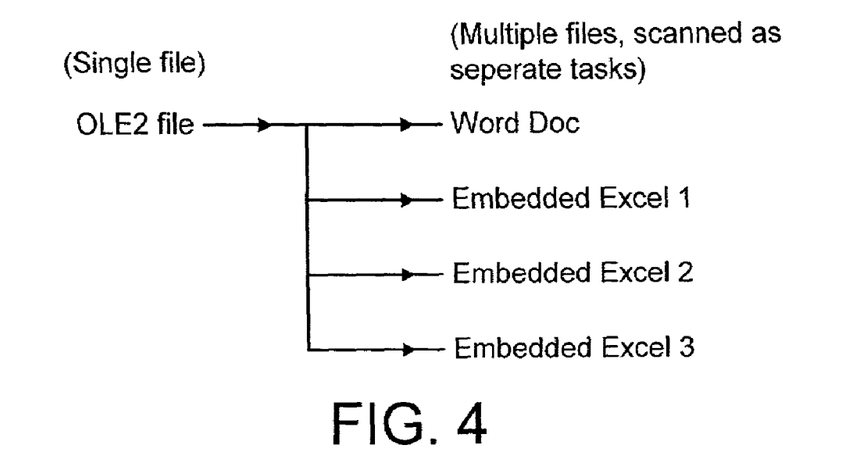
FIGS. 4 and 5 schematically illustrate the division of an on-access malware scan into separate tasks.

FIG. 4 illustrates a computer file to be scanned in the form of an OLE2 file. This example file is a Microsoft Word document that contains three embedded Excel spreadsheets. This is an example of a computer file which may be divided into component computer files that are then scanned as separate tasks. Splitting an object into separate objects scannable in their own right simplifies the handling and processing of the divided entities. Other examples of file types that may be split are ZIP, CAB, ARJ, RAR, ACE, JAR, ARC, LHA, LZH, ICE and StuffIt.

Figure 5:
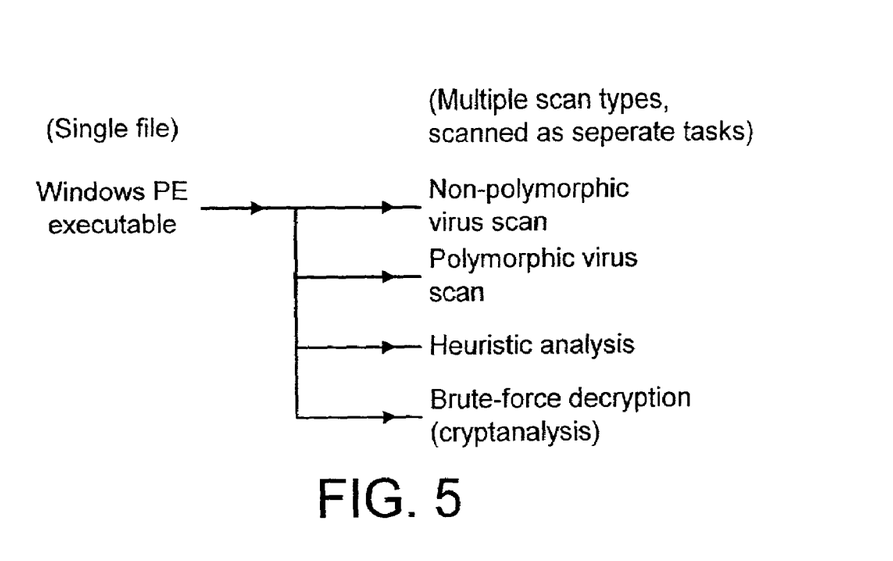

FIG. 5 illustrates a single computer file in the form of a Windows executable file. Depending upon the options set by a user, it may be desired to scan this executable file for non-polymorphic viruses, polymorphic viruses and perform heuristic analysis. Each of these scan types can be treated as a separate task and delegated to a different computer to be performed. Also any cryptographic or emulation analysis or portions of this may be split out as separate tasks.

Figure 6:
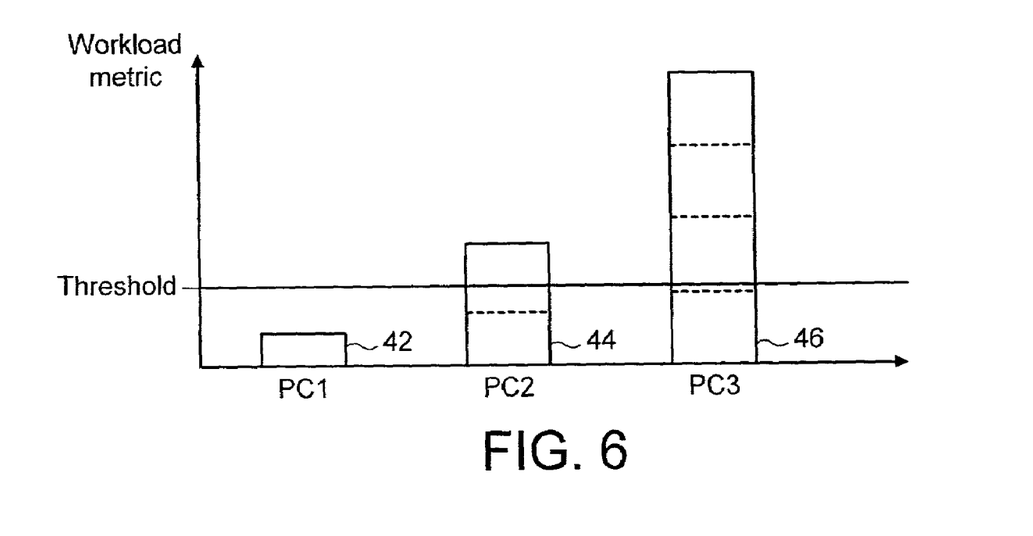
FIGS. 6 and 7 schematically illustrate how computers to which tasks are to be delegated may be selected.

FIG. 6 schematically illustrates an estimated workload metric for a plurality of different on-access malware scans and related computers. A first scan returns a metric value 42 in relation to its execution upon a computer PC1. This metric value 42 is below a threshold level and accordingly the scan is not divided and is performed by the computer PC1 itself. In the second example a metric value of 44 is returned in relation to a computer PC2. This metric value exceeds a threshold value and accordingly the scan is divided. The metric value only marginally exceeds the threshold value and so it is determined most appropriate to split this task into two parts. It may be that constraints dependent upon the computer file itself determine how many tasks it can be split into. As an example, if a computer file is being split into component computer files to be separately scanned, then the number of component computer files is not under control of the coordinating computer, but it would be possible to allocate multiple component files to a single further computer rather than having each component computer file allocated to a separate further computer. The metric value 46 returned in relation to the computer PC3 indicates a much higher workload associated with an on-access scan in this case and accordingly the scan is divided into four tasks that is each below the threshold level and may be distributed to a different computer.

Figure 7:
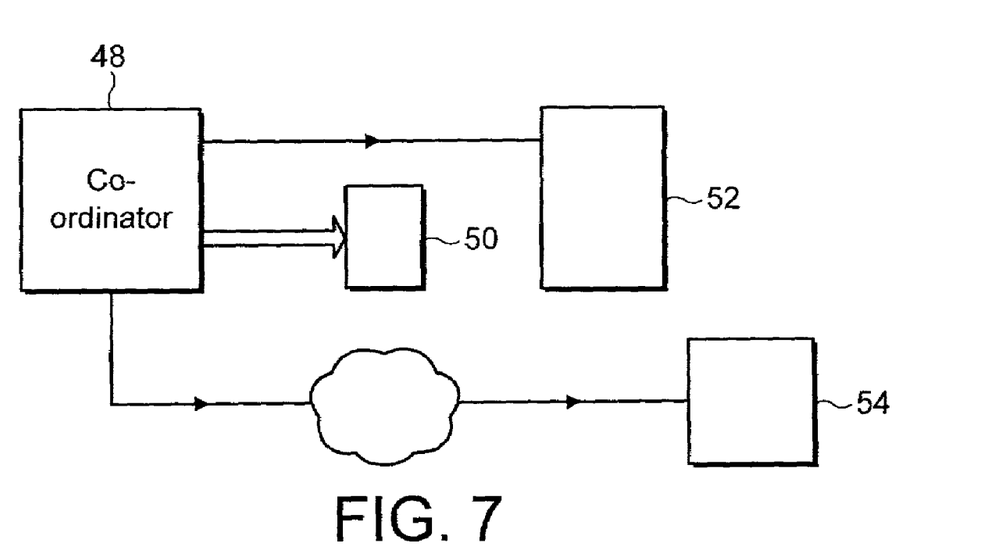

FIG. 7 illustrates a coordinating computer 48 having a plurality of further computers 50, 52, 54 associated with it and to which it may delegate scanning tasks. Each of these further computers 50, 52, 54 has different associated properties. The computer 50 has a relatively small processing capacity but is connected by a relatively high bandwidth link. Accordingly, the further computer 50 is appropriate to have tasks requiring a large amount of data transfer but that are in themselves relatively computationally non-intensive. The further computer 54 has a high processing capability but is linked to the coordinating computer 48 via a relatively low bandwidth internet link. Accordingly, the further computer 54 is suitable to have highly computationally intensive tasks delegated to it provided they do not require the transfer of a considerable amount of data. The further computer 52 is half way between these other examples having a relatively high processing capability and a relatively high connection bandwidth making it suitable for tasks that would otherwise be unsuitable for the other further computers 50, 54. The transmission time measured from received packets may also be used as a measure of the connection performance.

Figure 8:
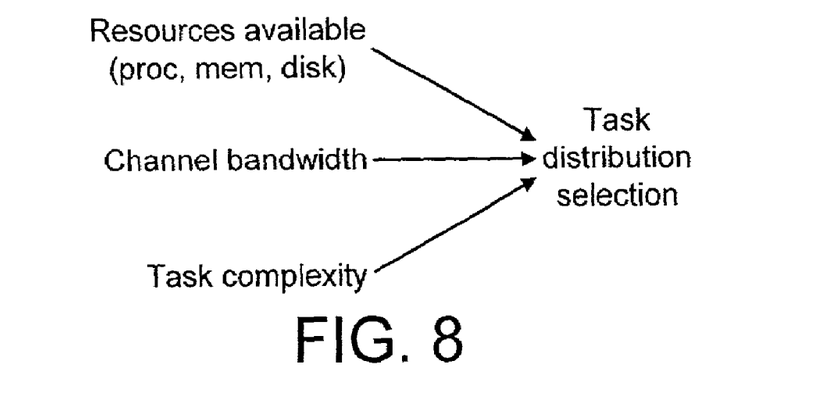
FIG. 8 schematically illustrates the factors that may influence task distribution.

FIG. 8 illustrates an example of how the task distribution selection may be dependent upon the above described parameters. The task distribution may be selected in dependence upon additional parameters not illustrated or in simple embodiments fewer parameters than those illustrated.

Figure 9:
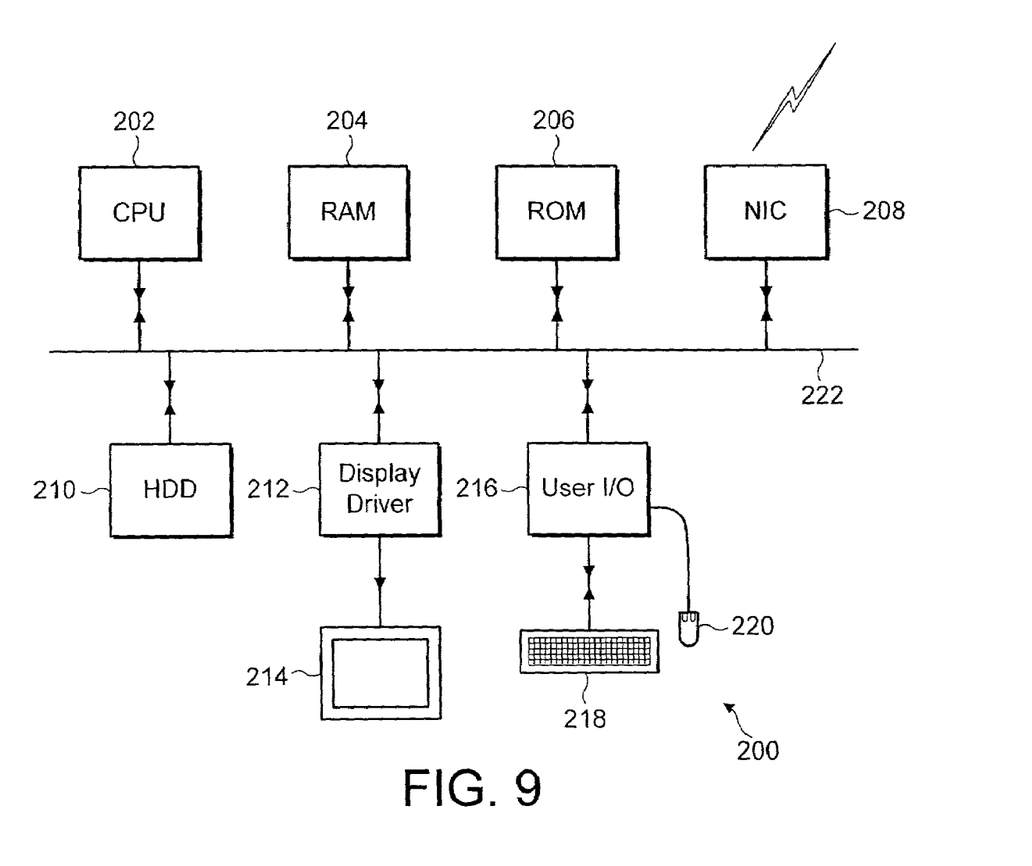
FIG. 9 schematically illustrates a general purpose computer of the type which may be used to implement the above described techniques.

FIG. 9 schematically illustrates a general purpose computer 200 of the type that may be used to implement the above described techniques. The general purpose computer 200 includes a central processing unit 202, a random access memory 204, a read only memory 206, a network interface card 208, a hard disk drive 210, a display driver 212 and monitor 214 and a user input/output circuit 216 with a keyboard 218 and mouse 220 all connected via a common bus 222. In operation the central processing unit 202 will execute computer program instructions that may be stored in one or more of the random access memory 204, the read only memory 206 and the hard disk drive 210 or dynamically downloaded via the network interface card 208. The results of the processing performed may be displayed to a user via the display driver 212 and the monitor 214. User inputs for controlling the operation of the general purpose computer 200 may be received via the user input output circuit 216 from the keyboard 218 or the mouse 220. It will be appreciated that the computer program could be written in a variety of different computer languages. The computer program may be stored and distributed on a recording medium or dynamically downloaded to the general purpose computer 200. When operating under control of an appropriate computer program, the general purpose computer 200 can perform the above described techniques and can be considered to form an apparatus for performing the above described technique. The architecture of the general purpose computer 200 could vary considerably and FIG. 9 is only one example, e.g. a server may not have a screen and a mouse or keyboard.

Embodiments may be provided where computers participating in the process exchange data on currently available resources (disk, processor utilization, processor speed, RAM). That also gives the information on the speed of communication over the network (packet transmission time). These factors may be used to influence complexity assessment and the way tasks are distributed.

Although illustrative embodiments of the invention have been described in detail herein with reference to the accompanying drawings, it is to be understood that the invention is not limited to those precise embodiments, and that various changes and modifications can be effected therein by one skilled in the art without departing from the scope and spirit of the invention as defined by the appended claims.

We claim:

1. A computer program product stored on a computer recordable medium for controlling a computer, said computer program product comprising:
   (i) scan request receiving logic operable to receive a request to perform an on-access malware scan upon a computer file to which access is to be made;
   (ii) scan dividing logic operable to divide said on-access malware scan into a plurality of tasks;

(iii) task issuing logic operable to issue said plurality of tasks to be performed by a plurality of different computers; and (iv) result collating logic operable to collate a plurality of task results corresponding to said plurality of tasks and received from said plurality of different computer to form a scan result corresponding to said on-access malware scan;

wherein said scan dividing logic divides said on-access malware scan in response to a complexity metric exceeding a predetermined threshold, where the complexity metric is dependent on at least one parameter;

wherein the complexity metric is dependent on a plurality of parameters including a computer file type, a level of nesting of embedded computer files, an initial attempt to scan said computer file which exceeded a predetermined time, and a level of utilization of a local processor.

2. A computer program product as claimed in claim 1, wherein said scan dividing logic further divides said computer file into a plurality of component computer files to be separately scanned as said plurality of tasks.

3. A computer program product as claimed in claim 2, wherein said computer file contains one or more embedded computer files which are further divided out as component computer files.

4. A computer program product as claimed in claim 3, wherein said computer file is one of the following computer file types: OLE2, ZIP, CAB, ARJ, RAR, ACE, JAR, ARC, LHA, LZH, ICE and StuffIt.

5. A computer program product as claimed in claim 1, wherein said scan dividing logic further divides said on-access malware scan into a plurality of on-access malware scans for identifying different properties of said computer file, said plurality of on-access malware scans being separately performed as said plurality of tasks.

6. A computer program product as claimed in claim 5, wherein said plurality of tasks each seek to further identify different portions of one of a cryptographic analysis and an emulation analysis.

7. A computer program product as claimed in claim 1, wherein said on-access malware scan of said computer file seeks to identify one or more of:
   (i) a computer virus;
   (ii) a Trojan computer program;
   (iii) a worm computer program;
   (iv) a banned computer program; and
   (v) an e-mail containing banned content.

8. A computer program product as claimed in claim 1, wherein one or more of said tasks are further divided into sub-tasks.

9. A computer program product stored on a computer recordable medium for controlling a computer, said computer program product comprising:
   (i) scan request receiving logic operable to receive a request to perform an on-access malware scan upon a computer file to which access is to be made;
   (ii) scan dividing logic operable to divide said on-access malware scan into a plurality of tasks;
   (iii) task issuing logic operable to issue said plurality of tasks to be performed by a plurality of different computers; and
   (iv) result collating logic operable to collate a plurality of task results corresponding to said plurality of tasks and received from said plurality of different computers to form a scan result corresponding to said on-access malware scan;

wherein said scan dividing logic divides said on-access malware scan in response to a complexity metric exceeding a predetermined threshold, where the complexity metric is dependent on at least one parameter;

wherein an amount of said complexity metric that exceeds said predetermined threshold determines a number of tasks into which said on-access malware scan is divided.

10. A computer program product as claimed in claim 9, wherein said scan dividing logic further divides said computer file into a plurality of component computer files to be separately scanned as said plurality of tasks.

11. A computer program product as claimed in claim 10, wherein said computer file contains one or more embedded computer flies which are further divided out as component computer files.

12. A computer program product as claimed in claim 11, wherein said computer file is one of the following computer file types: OLE2, ZIP, CAB, ARJ, RAR, ACE, JAR, ARC, LHA, LZH, ICE and StuffIt.

13. A computer program product as claimed in claim 9, wherein said scan dividing logic further divides said on-access malware scan into a plurality of on-access malware scans for identifying different properties of said computer file, said plurality of on-access malware scans being separately performed as said plurality of tasks.

14. A computer program product as claimed in claim 13, wherein said plurality of tasks each seek to further identify different portions of one of a cryptographic analysis and an emulation analysis.

15. A computer program product as claimed in claim 9, wherein said on-access malware scan of said computer file seeks to identify one or more of:
   (i) a computer virus;
   (ii) a Trojan computer program;
   (iii) a worm computer program;
   (iv) a banned computer program; and
   (v) an e-mail containing banned content.

16. A computer program product as claimed in claim 9, wherein one or more of said tasks are further divided into sub-tasks.

* * * * *

UNITED STATES PATENT AND TRADEMARK OFFICE
CERTIFICATE OF CORRECTION

PATENT NO. : 7,243,373 B2  Page 1 of 1
APPLICATION NO. : 09/911765
DATED : July 10, 2007
INVENTOR(S) : Muttik et al.

It is certified that error appears in the above-identified patent and that said Letters Patent is hereby corrected as shown below:

In the claims:
col. 6, line 60 replace "stored" with --embodied--;
col. 6, line 61 replace "recordable" with --readable--;
col. 7, line 6 replace "computer" with --computers--;
col. 7, line 52 replace "stored" with --embodied--;
col. 7, line 53 replace "recordable" with --readable--;
col. 8, line 25 replace "flies" with --files--.

Signed and Sealed this

Ninth Day of February, 2010

David J. Kappos
*Director of the United States Patent and Trademark Office*